(12) United States Patent
Krasnoff

(10) Patent No.: US 12,438,650 B2
(45) Date of Patent: Oct. 7, 2025

(54) STORING DATA IN TRANSIT OVER LINKS OF A NETWORK

(71) Applicant: DUPLICENT, LLC, Santa Monica, CA (US)

(72) Inventor: Curren Emmett Krasnoff, Santa Monica, CA (US)

(73) Assignee: Duplicent, LLC, Santa Monica, CA (US)

( * ) Notice: Subject to any disclaimer, the term of this patent is extended or adjusted under 35 U.S.C. 154(b) by 522 days.

(21) Appl. No.: 17/897,078

(22) Filed: Aug. 26, 2022

(65) Prior Publication Data

US 2023/0318754 A1 Oct. 5, 2023

Related U.S. Application Data

(63) Continuation of application No. PCT/US2021/026468, filed on Apr. 8, 2021.

(60) Provisional application No. 63/013,067, filed on Apr. 21, 2020.

(51) Int. Cl.
*G06F 15/16* (2006.01)
*H04L 1/1829* (2023.01)
*H04L 1/24* (2006.01)

(52) U.S. Cl.
CPC ............ *H04L 1/1861* (2013.01); *H04L 1/243* (2013.01)

(58) Field of Classification Search
CPC .... H04L 1/1861; H04L 1/243; H04L 67/1097
See application file for complete search history.

(56) References Cited

U.S. PATENT DOCUMENTS

| | | | | |
|---|---|---|---|---|
| 5,854,816 A * | 12/1998 | Kim | ........................ | H04L 43/50 714/716 |
| 7,275,107 B1 * | 9/2007 | Barker | ................ | H04L 67/1097 709/227 |
| 7,636,760 B1 * | 12/2009 | Fein | ........................ | H04L 67/63 709/212 |
| 11,609,931 B2 * | 3/2023 | Sedan | ................ | G06F 16/2379 |

(Continued)

OTHER PUBLICATIONS

International Preliminary Report on Patentability in International Appln. No. PCT/US2021/026468, mailed on Nov. 3, 2022, 6 pages.

(Continued)

*Primary Examiner* — Razu A Miah
(74) *Attorney, Agent, or Firm* — Fish & Richardson P.C.

(57) ABSTRACT

A method for storing information on a computer network that includes receiving data to be stored as propagating signals over network connections of the network for a duration of storage. The method includes generating a data packet including the data and accessing instructions having a parameter necessary for retrieving the data from the network connections of the network. The method includes transmitting the data packet to the network which includes multiple nodes and the network connections, in which each node is configured, for the duration of storage, to receive the data packet, and upon receiving the data packet, execute instructions to transmit the data packet to another node of the network over an associated network connection. As such, the data packet is stored as a propagating signal over the network connections of the network for the duration of storage.

14 Claims, 3 Drawing Sheets

(56) References Cited

U.S. PATENT DOCUMENTS

| | | | | |
|---|---|---|---|---|
| 2006/0285547 | A1* | 12/2006 | Takeuchi | H04L 12/40084 370/403 |
| 2007/0214105 | A1* | 9/2007 | Sfarti | H04L 67/1097 |
| 2011/0125721 | A1 | 5/2011 | Fein et al. | |
| 2011/0167131 | A1* | 7/2011 | Fein | H04L 51/04 709/217 |
| 2013/0066951 | A1* | 3/2013 | Agranat | H04L 67/1097 709/217 |
| 2014/0281066 | A1* | 9/2014 | Grube | G06F 11/1076 710/74 |
| 2014/0281817 | A1* | 9/2014 | Grube | H04L 41/5054 714/769 |
| 2015/0222276 | A1* | 8/2015 | Milijevic | H03L 7/087 327/147 |
| 2018/0167439 | A1* | 6/2018 | Huang | H04L 67/10 |
| 2019/0187690 | A1* | 6/2019 | Cella | H04L 67/12 |

OTHER PUBLICATIONS

International Search Report and Written Opinion in International Appln. No. PCT/US2021/026468, mailed on Jul. 14, 2021, 11 pages.

* cited by examiner

STORING DATA IN TRANSIT OVER LINKS OF A NETWORK

CROSS-REVERENCE TO RELATED APPLICATION

This application is a continuation of International Patent Application No. PCT/US20211026468, filed Apr. 8, 2021, which claims the benefit of and priority to U.S. Provisional Patent Application No. 63/013,067, filed Apr. 21, 2020, the entirety of which is incorporated herein by reference.

BACKGROUND

Storage mediums such as solid state drives (SSDs) may be used to store information such as computer-executable instructions. As the amount of computing power in computing devices increases (e.g., the number of transistors per unit area, etc.), a need for increased storage capacity may also increase.

SUMMARY

One embodiment relates to a method for storing information on a computer network, comprising receiving, from a first computing device by a second computing device, data to be stored, generating, by the second computing device, a data packet including the data and accessing instructions having a parameter necessary for retrieving the data, and serving, by the second computing device, the data packet to a network comprising one or more nodes and one or more connections between the one or more nodes, wherein the data packet is stored on the network for a period of time by repetitive transmission of the data packet across at least one of the one or more connections.

In some embodiments, the one or more nodes include a computing device. In some embodiments, the at least one of the one or more connections constitute a path that originates and terminates at the second computing device, thereby forming a data loop. In some embodiments, repetitive transmission of the data packet includes retransmission of the data packet around the data loop by the second computing device, in response to receiving the data packet. In some embodiments, the method further comprises identifying an existing data loop storing a different data packet and inserting the data packet into different data packet of the existing data loop. In some embodiments, storing the data packet on the network includes storing the data packet in two or more data loops in parallel. In some embodiments, at least one of the second computing device or the one or more nodes includes a server. In some embodiments, the method further comprises receiving, by the second computing device, a request for access to the data, retrieving, by the second computing device, the accessing instructions including the parameter, and retrieving, by the second computing device, the data from the network according to the accessing instructions. In some embodiments, the parameter describes an index location of the data packet where the data is located, and wherein retrieving the data includes reading the data packet at the index location. In some embodiments, retrieving the data from the network includes retrieving a first portion of the data from a first location on the network and retrieving a second portion of the data from a second location on the network. In some embodiments, the second computing device retrieves the first portion and the second portion in parallel. In some embodiments, the one or more connections include a fiber-optic cable. In some embodiments, repetitive transmission of the data includes transmitting the data through the fiber-optic cable using infrared light. In some embodiments, the data packet includes a stop bit. In some embodiments, repetitive transmission of the data packet includes representing the data packet using a time-varying voltage signal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
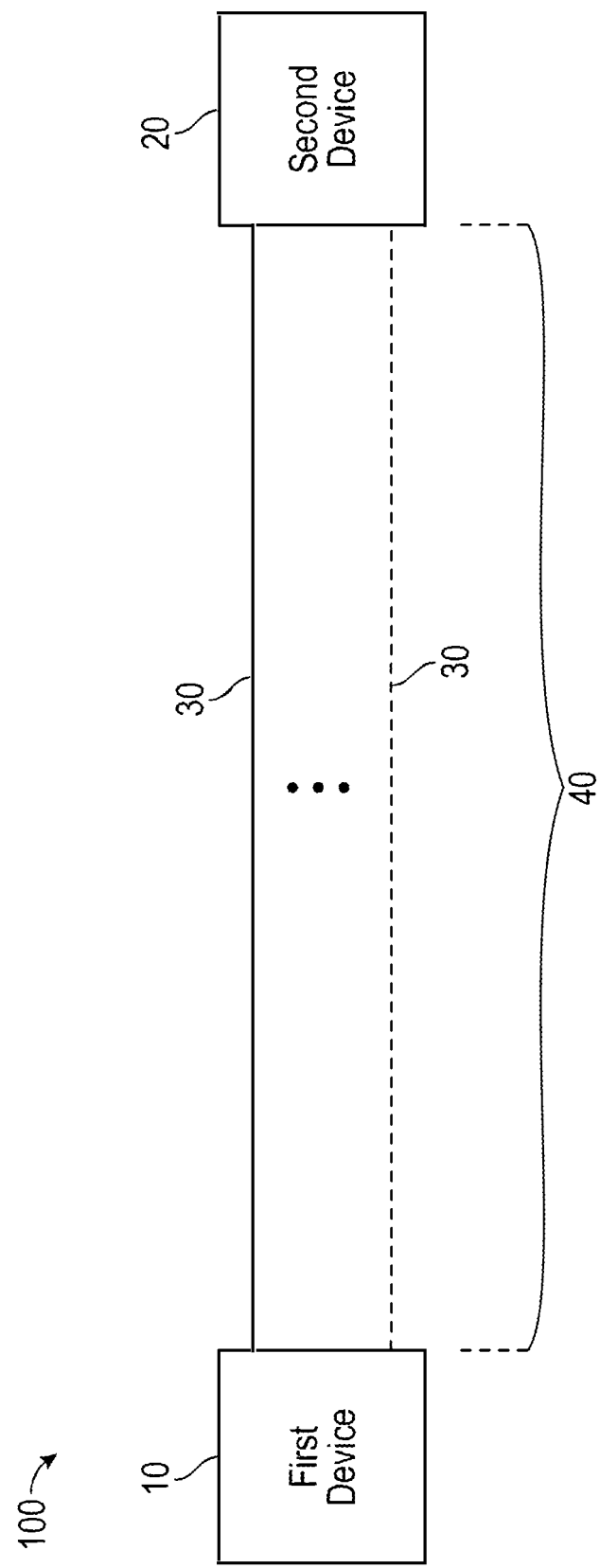
FIG. 1 is a schematic diagram of a suspended data storage system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring now generally to the Figures, systems and methods of internet storage are described herein. In various embodiments, information such as audio information, video information, image information, text, numbers, and the like are stored using electromechanical elements such as hard disk drives (HDDs) and/or with integrated circuits such as solid-state drives (SSDs), and/or the like. For example, a matrix representing sensor measurements from a telescope may be stored using NAND flash storage (e.g., via the operational states of one or more transistors, etc.). Many will appreciate that demands for information storage capacity arm increasing. However, traditional information storage devices often require specific materials to be produced. For example, SSDs may require elements such as germanium, gold, copper, and/or the like to produce. Such elements may be finite resources. Therefore, producing enough traditional storage devices to meet rising demand may consume the readily accessible quantities of such elements, thereby making it infeasible to produce enough traditional storage devices to meet long-term demand. Accordingly, there is a need for systems and methods that provide novel forms of information storage.

One solution, as described herein, includes systems and methods of internet storage. In various embodiments, self-propagating waves such as electromagnetic radiation may be used to carry and/or represent information. For example, electromagnetic radiation in the infrared spectrum (e.g., infrared light) may be used to represent information in fiber-optic communication systems (e.g., by serving as a carrier wave for the information, etc.). As another example, free-space optical communication (e.g., a photophone, etc.) may encode information into light, thereby spatially and temporally transmitting the encoded information. One of skill in the art will appreciate that self-propagating waves such as electromagnetic radiation may temporally transport (e.g., store) information without the need for traditional storage devices such as SSDs. For example, the Arecibo message encoded 1,679 bits of information in radio waves that will have effectively stored the 1,679 bits of information for 25,000 years before the Arecibo message reaches its intended receiver. Systems and methods of the present disclosure may utilize a signal such as a self-propagating wave, a time varying voltage, current, and/or the like to store information in transit between two or more locations. For example, a network such as the Internet may include a number of nodes (e.g., computing devices such as a personal computer, etc.) and systems and methods of the present disclosure may continuously transmit information between the number of nodes, thereby suspending (e.g., storing) the information via transmission. In various embodiments, the suspended data storage system of the present disclosure may facilitate suspending (e.g., storing) information via transmission. For example, the suspended data storage system of the present disclosure may facilitate transmitting data over a network between a first location and a second location such that the data is stored in transit between the first location and the second location. Upon arrival at the second location, the data may be transmitted to another location, such as back to the first location, thereby creating a "data loop" that may be used to continuously store (e.g., provide persistent storage to, etc.) the data in transit (e.g., on the network). In various embodiments, such data loops may be extended to store large amounts of information using existing infrastructure. For example, existing network infrastructure such as the infrastructure enabling the Internet may store billions of data loops thereby enabling vast amounts of information to be stored without the need for traditional storage devices such as SSDs.

Referring now to FIG. 1, suspended data storage system 100 is shown, according to an exemplary embodiment. Suspended data storage system 100 may facilitate creating one or more data loops to store information in transit between one or more locations. Suspended data storage system 100 may offer many benefits over traditional storage devices such as SSDs. For example, suspended data storage system 100 may utilize existing network infrastructure to store information, thereby reducing an amount of new devices that need to be produced. Additionally, suspended data storage system 100 may facilitate high bit rates, low bit error rates, and/or may facilitate full duplex operations (e.g., via optical signal transmission, etc.). Suspended data storage system 100 is shown to include first device 10 and second device 20. In various embodiments, first device 10 and second device 20 are computing devices. For example, first device 10 may include a processing circuit including a processor and memory, the memory having instructions stored thereon that, when executed by the processor, cause the processing circuit to perform one or more operations as described herein. As another example, first device 10 may include a desktop computer and second device 20 may include a smartphone. In some embodiments, first device 10 and/or second device 20 are existing devices connected to a network such as the Internet. For example, first device 10 and/or second device 20 may be existing computing devices that execute computer-readable instructions to implement suspended data storage system 100 (e.g., by formatting and/or transmitting data according to a data loop scheme, etc.). Additionally or alternatively, first device 10 and/or second device 20 may be purpose-built computing devices forming a network and/or augmenting an existing network such as the Internet. For example, first device 10 and/or second device 20 may include a computing device configured to (i) receive data, (ii) prepare a data loop using the received data by formatting the data to include accessing instructions, (iii) generate a data loop using the formatted data by transmitting the formatted data over one or more network connections, and/or (iv) access the data loop, in response to an access request, using the accessing instructions. It should be understood that while suspended data storage system 100 is shown to include first device 10 and second device 20, suspended data storage system 100 may include any number of computing devices and/or systems and that suspended data storage system 100 may be modified (e.g., expanding storage capabilities, etc.) by adding and/or removing computing devices and/or systems at any point. For example, suspended data storage system 100 may include several billion devices spread out over a large area (e.g., several continents, etc.) that are connected via a network such as the Internet and cooperate to store large quantities of data (e.g., a number of exabytes (EB) or more, etc.). In some embodiments, first device 10 and/or second device 20 are servers.

In various embodiments, first device 10 and second device 20 communicate via connection 30. Connection 30 may include a communication element such as an optical fiber (e.g., fiber-optics, etc.), a wire, a waveguide, a router, a switch, a relay, and/or the like. Additionally or alternatively, connection 30 may include a free-space connection such as a vacuum between two mirrors. In various embodiments, connection 30 includes a network connection and/or network infrastructure such as an Internet connection. For example, connection 30 may include computer networks such as the Internet, local, wide, metro or other area networks, intranets, satellite networks, other computer networks such as voice or data mobile phone communication networks, combinations thereof, or any other type of electronic communications network. In some embodiments, connection 30 facilitates secure communication between components of suspended data storage system 100. As a non-limiting example, connection 30 may implement transport layer security (TLS), secure sockets layer (SSL), hypertext transfer protocol secure (HTTPS), and/or any other secure communication protocol. It should be understood that while suspended data storage system 100 is shown to include a single connection 30, suspended data storage system 100 may include any number of connections 30 and that suspended data storage system 100 may be modified (e.g., expanding storage capabilities, etc.) by adding and/or removing connections 30 and/or components thereof at any point.

In various embodiments, connection 30 may be associated with a distance 40. For example, distance 40 may include a measure of the distance of an optical fiber communicably connecting first device 10 and second device 20. In some embodiments, suspended data storage system 100 may increase distance 40 to increase an amount of temporal transmission associated with each iteration (e.g., revolution, etc.) of a data loop, thereby providing for longer data storage per iteration. For example, a first data loop spanning between New York and Hong Kong may store data for ~65,000 microseconds (μs) per iteration (e.g., assuming refractive index of ~1.467 for a single-mode optical fiber, etc.) and may be extended to store data for ~80,000 μs per iteration by extending the data loop from spanning between New York and Hong Kong to spanning between New York and Sydney Australia. In some embodiments, distance 40 is increased via pathing. For example, a compact coil (e.g., a looped fiber-optic coil having a number of loops, etc.) may provide an equivalent temporal transmission of data as a connection spanning between New York and Hong Kong while remaining compact in size (e.g., by producing a coil of fiber-optic cable having an equivalent length as a fiber-optic cable stretching linearly between New York and Hong Kong, etc.). Additionally or alternatively, a temporal transmission period (e.g., an amount of time information is stored in transit per iteration, etc.) may be adjusted without changing distance 40. For example, a transmission speed associated with connection 30 may be adjusted to control an amount of time information is suspended in transmission. In some embodiments, adjusting a transmission speed includes an optical density of connection 30. For example, a first single-mode optical fiber connection 30 having a refractive index of ~1.47 may be replaced with a second connection 30 using gallium phosphide having a refractive index of ~3.50 to increase a storage time by ~14 μs/mile per iteration.

Figure 2:
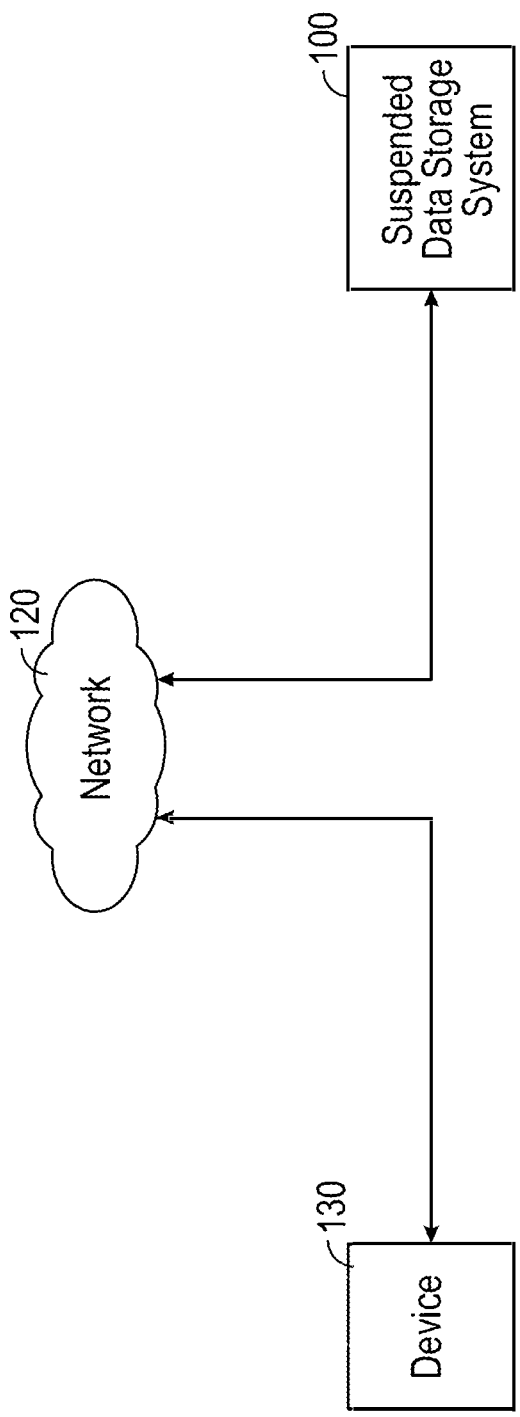
FIG. 2 is a schematic diagram of an edge device using the suspended data storage system of FIG. 1 to store and access data, according to an exemplary embodiment.

Referring now to FIG. 2, suspended data storage system 100 in communication with device 130 via network 120 is shown, according to an exemplary embodiment. In various embodiments, suspended data storage system 100 receives, stores, and/or transmits stored information with one or more devices/systems such as device 130. For example, suspended data storage system 100 may receive information such as a JPEG image from device 130 and store the JPEG image in a data loop for later retrieval. In various embodiments, suspended data storage 100 generates one or more data loops to store information. For example, suspended data storage 100 may generate hundreds, millions, billions, and/or trillions of data loops to store information. Suspended data storage system 100 may generate data loops between one or more devices (e.g., first device 10, etc.). For example, suspended data storage system 100 may generate a data loop using a first device that transmits data via a circular connection to itself. As another example, suspended data storage system 100 may generate a number of data loops between a first device and a number of second devices, where the number of data loops store information in series and/or parallel. In various embodiments, the data loops are replicated (e.g., retransmitted, etc.) a number of times. For example, a data loop having a transmission period of ~80,000 μs per iteration may be replicated ~395,000,000 times to store the information in the data loop for one year. In various embodiments, suspended data storage system 100 may combine data loops. For example, suspended data storage system 100 may string together a number of data loops (e.g., the connections 30 on which each data loop exists, etc.) to generate a new data loop having a long transmission period than the constituent data loops.

It should be understood that data may be stored and/or retrieved from suspended data storage system 100 in series and/or in parallel. For example, a number of data loops storing the same information may be access simultaneously (e.g., in parallel, etc.) to increase data retrieval speeds. In various embodiments, suspended data storage system 100 generates each data loop to include data accessing instructions. For example, a data loop may include accessing instructions (e.g., in a header at the beginning of the data loop, etc.) including a summary of what data is included in the data loop (e.g., where in the data loop each piece of data is, etc.). In some embodiments, suspended data storage system 100 may identify data within a data loop using triggering information (e.g., triggering information included in the accessing instructions, etc.). For example, suspended data storage system 100 may retrieve triggering information indicating at what time interval (e.g., a delay measured from a beginning of the data loop, etc.) of a data loop a particular piece of data is located and may retrieve the particular piece of data using the time interval. In some embodiments, the triggering information may be specified for data loop intervals. For example, the triggering information may specify an interval at which data in the data loop should be accessed (e.g., every 100 loops, every 1,000,000 loops, etc.). In various embodiments, the triggering information facilitates accessing data in a specific data loop and/or a specific series of data loops.

In some embodiments, the triggering information may be specified for a specific data loop interval. For example, the triggering information may specify a specific iteration of the data loop at which data in the data loop should be accessed (e.g., the millionth iteration, the trillionth iteration, etc.). Additionally or alternatively, data may be accessed mid-iteration. For example, a full data loop may be generated between five computing devices where one full iteration is defined as devices 1-5 transmitting in numerical order, and the data loop may be accessed mid-iteration by device 3. In some embodiments, information stored in data loops is discarded (e.g., deleted, not re-transmitted, etc.). For example, suspended data storage system 100 may discard 1 μs worth of received data before accessing a particular portion of a data loop. In some embodiments, accessing instructions may provide information on a number of data loops. For example, a first data loop may include accessing instructions for a number of other data loops that share a common node, thereby facilitating accessing multiple loops simultaneously using the accessing instructions from the first data loop. In various embodiments, suspended data storage system 100 may facilitate multiple devices to interact with a single data loop simultaneously. For example, a single data loop including three nodes (e.g., devices such as device 130, etc.) may form an iteration where the single data loop may include two copies of the information transmitted in series (e.g., such that a first device is receiving a first copy just as a second device is receiving a second copy, as if the data were players in a ring-around-the-rosie game, etc.), thereby enabling two or more of the three nodes to access the single data loop simultaneously. In various embodiments, the data accessing instructions are stored on a computing device (e.g., a server, etc.) that sends and receives the data loop (e.g., instead of in the data loop, etc.). Additionally or alternatively, the data accessing instructions may be stored in a cloud computing system. In some embodiments, a cloud computing system may process the data loops (e.g., which may happen simultaneously for many devices, etc.) and may send actionable data to an end device such as a smartphone, a computer, and/or the like.

In various embodiments, device 130 sends and/or receives data from suspended data storage system 100 via network 120. Network 120 may include the Internet. Additionally or alternatively, network 120 may include other networks such as local-area networks, wide-area networks, cellular networks, satellite networks, optical networks (e.g., such as laser networks, etc.), and/or the like. In some embodiments, suspended data storage system 100 includes network 120 and/or device 130. For example, suspended data storage system 100 may store information in data loops generated within network 120 by device 130 executing machine-readable instructions. Additionally or alternatively, network 120 may include suspended data storage system 100. For example, network 120 may include the Internet and suspended data storage system 100 may include a number of devices communicably coupled to the Internet and configured to generate data loops to suspend information (e.g., store information, etc.) on the Internet.

Suspended data storage system 100 may offer many benefits to systems/devices (e.g., device 130, etc.) that utilize suspended data storage system 100 to store information. For example, device 130 may reduce on-device memory by utilizing suspended data storage system 100 to store information in one or more data loops, thereby reducing weight, enabling smaller devices, and reducing costs. As another example, device 130 may store program instructions for one or more applications/scripts executed by device 130 using suspended data storage system 100. Therefore, device 130 may receive program instructions directly from suspended data storage system 100 (e.g., from Internet storage) and execute the received program instructions to perform one or more actions.

Figure 3:
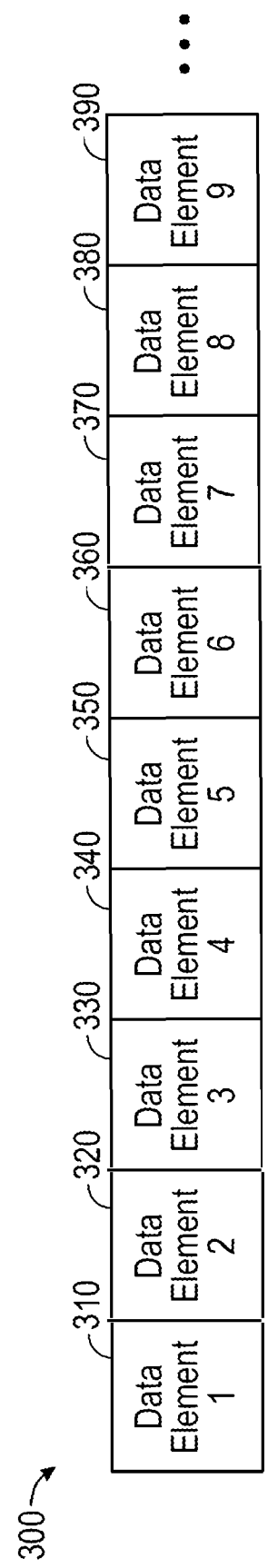
FIG. 3 is a diagram illustrating a data formatting used by the data storage system of FIG. 1, according to another exemplary embodiment.

Referring now to FIG. 3, format 300 is shown, according to an exemplary embodiment. In various embodiments, suspended data storage system 100 receives data and formats the data according to format 300 for transmission as a data loop. In various embodiments, format 300 includes a number of elements, shown as data elements 310-390. Data elements 310-390 may include information such as data representing audio, video, pictures, and/or the like. It should be understood that data elements 310-390 may represent any information. In various embodiments, data elements 310-390 include information encoded in a binary format. Additionally or alternatively, data elements 310-390 may include information encoded in another format (e.g., hexadecimal format, compressed format, etc.). In various embodiments, each of data elements 310-390 is a uniform size (e.g., 1024 bytes, etc.). Additionally or alternatively, each of data elements 310-390 may be dynamically sized (e.g., sized based on an amount of information to be stored, etc.). In various embodiments, suspended data storage system 100 receives data and assigns each piece of received data to one of data elements 310-390. For example, suspended data storage system 100 may receive three pieces of data (e.g., an image, an MP3, and a movie, etc.) and may generate a first data loop including accessing instructions at data element one 310, the first piece of data at data element two 320, the second piece of data at data element three 330, and the third piece of data at data element four 340 (e.g., with the other data elements being empty, etc.). In some embodiments, the last data element includes an end indicator (e.g., a STOP bit, etc.). In various embodiments, data element one 310 is reserved for accessing instructions including triggering information. For example, data element one 310 may be a header listing an element index of each of the data elements (e.g., data elements 320-390, etc.). In various embodiments, the accessing instructions include a list of where each piece of data is stored and context information about each piece of information. For example, a first JPEG may be stored at data element two 320 and the accessing instructions may include a list including an entry describing data element two 320 as containing the first JPEG. In various embodiments, each piece of information is associated with an identifier. For example, a device wishing to access a particular piece of information may supply an identifier associated with the piece of information (e.g., a lookup address, etc.) to suspended data storage system 100 and suspended data storage system 100 may retrieve the piece of information associated with the identifier (e.g., using a lookup table listing the index of the data element associated with the identifier in the accessing instructions, etc.). In various embodiments, the accessing instructions include context information. For example, the accessing instructions may include a file size, an author, metadata, an expiration data, and/or the like. In various embodiments, suspended data storage system 100 may access data loops simultaneously. For example, many accessing devices may access data loops simultaneously in parallel. It may be appreciated by one of skill in the art that data loops may be sent between a number of locations (e.g., a million locations, three million locations, etc.). For example, suspended data storage system 100 may generate a data loop that is connected to (e.g., travels between, etc.) three million locations (e.g., devices, nodes, etc.).

Figure 4:
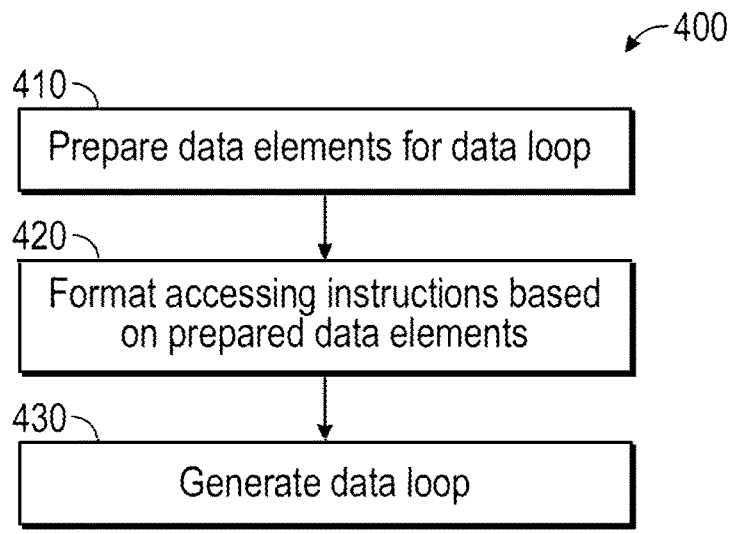
FIG. 4 is a flow diagram illustrating a method of storing data using the suspended data storage system of FIG. 1, according to another exemplary embodiment.

Referring now to FIG. 4, method 400 for generating a data loop is shown, according to an exemplary embodiment. In various embodiment, suspended data storage system 100 performs method 400. For example, one or more systems/devices/servers (e.g., first device 10, second device 20, etc.) may perform method 400. At step 410, suspended data storage system 100 may prepare data elements for a data loop. In various embodiments, step 410 includes receiving data from an external system. For example, a server may receive information from a desktop computing device and the server may prepare the information for storage in a data loop. In some embodiments, step 410 includes converting a format of the received data. For example, suspended data storage system 100 may convert received information from a base ten representation to a binary representation. In various embodiments, step 410 includes ordering one or more data elements to be included in a data loop. For example, suspended data storage system 100 may receive ten pieces of information and may assign each piece of information to a data element location (e.g., one of data elements 310-390, etc.). Additionally or alternatively, step 410 may include determining a location for a piece of information in an existing data loop. For example, suspended data storage system 100 may receive a piece of information from a first device and may identify a location in an existing data loop near other information received from the first device that is already stored in the existing data loop to store the piece of information (e.g., through insertion of a new data element, by expanding an existing data element, etc.).

At step 420, suspended data storage system 100 may format accessing instructions according to the prepared data elements. In various embodiments, step 420 includes generating a header for a data loop. For example, suspended data storage system 100 may generate a header for data element one 310 including accessing instructions having a list of each data element and the information stored in each data element (e.g., "index 1=ID #302390290923," where "index 1" is a reference to the data element index and "ID #302390290923" is a reference to a piece of information stored by suspended data storage system 100, etc.). In various embodiments, step 420 may include retrieving information associated with one or more connections that will form the new data loop. For example, suspended data storage system 100 may retrieve a temporal transmission period associated with an iteration around a path (e.g., one or more network connections forming the basis for a data loop, etc.) and may format the accessing instructions based on the retrieved temporal transmission period (e.g., to include a time interval such as a delay measured from a beginning of the data loop to each piece of data, etc.).

At step 430, suspended data storage system 100 may generate a data loop. In various embodiments, step 430 includes transmitting the prepared data elements and/or formatted accessing instructions. For example, suspended data storage system 100 may transmit a packet of information from a first device to a second device. In some embodiments, step 430 includes transmitting the prepared data elements and/or formatted accessing instructions a number of times (e.g., iteratively in a loop, etc.). In various embodiments, suspended data storage system 100 may continuously store (e.g., iteratively retransmit, etc.) the prepared data elements and/or formatted accessing instructions for a duration of needed storage. In various embodiments, data loop refers to information transmitted continuously over one or more paths (e.g., connection 30, etc.). For example, a data loop may be a series of connections between a number of nodes (e.g., computing devices, servers, etc.) upon which information is iteratively transmitted. In various embodiments, data loops facilitate storing information via suspending the information in transit (e.g., over one or more paths of the data loop, etc.). In various embodiments, suspended data storage system 100 generates data loops on the Internet. For example, the Internet may include a number of nodes and connections between the nodes and suspended data storage system 100 may create one or more paths using the connections and may generate one or more data loops on the one or more paths.

Figure 5:
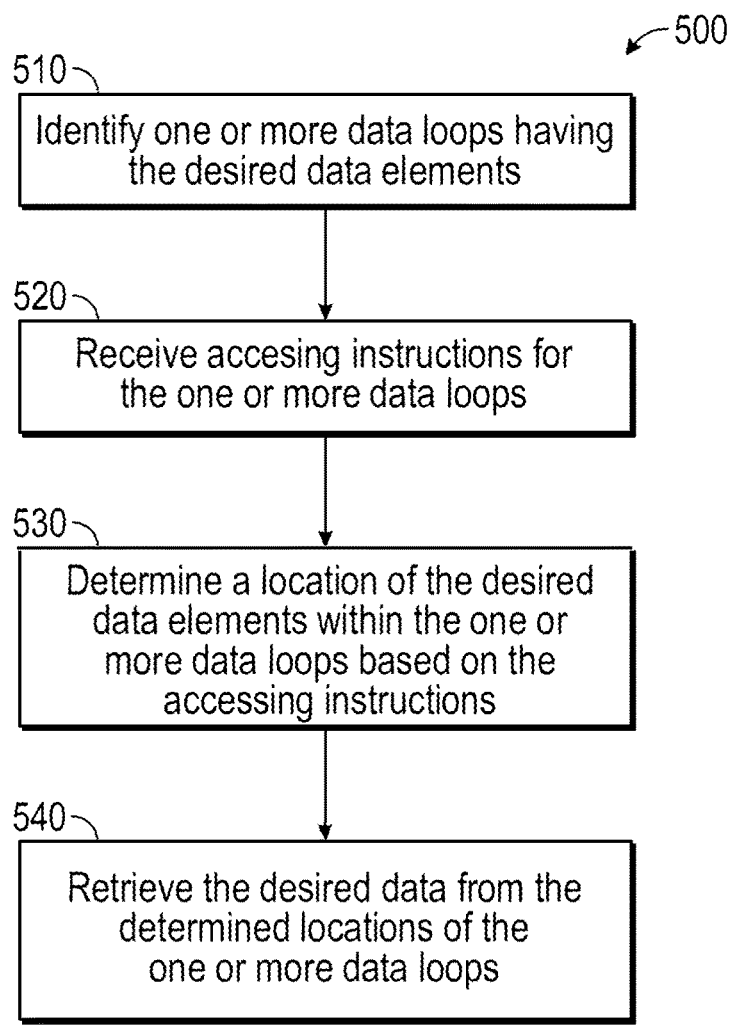
FIG. 5 is a flow diagram illustrating a method of accessing data stored by the suspended data storage system of FIG. 1, according to another exemplary embodiment.

Referring now to FIG. 5, method 500 for accessing information stored in a data loop is shown, according to an exemplary embodiment. In various embodiments, suspended data storage system 100 performs method 500. For example, one or more devices (e.g., first device 10, etc.) that are part of suspended data storage system 100 may retrieve data from a data loop on a network such as the Internet. At step 510, suspended data storage system 100 (e.g., a device of suspended data storage system 100 such as first device 10, etc.) may identify one or more data loops having the desired data elements. In various embodiments, step 510 includes identifying a data element having the desired information. For example, a device wishing to retrieve a JPEG image may perform a lookup using a table mapping identifiers referencing a piece of information to a particular data element (e.g., an index, etc.). In various embodiments, step 510 includes mapping a particular data element to a particular data loop. For example, a device wishing to retrieve a JPEG image having a first identifier located at a particular data element may perform a lookup using a table mapping the particular data element to a particular data loop. In various embodiments, step 510 includes retrieving a data loop identifier, a data element identifier (e.g., where the data element identifier is particular to the specific data loop, etc.), and/or an identifier referencing a piece of information (e.g., the information to be retrieved, etc.). In some embodiments, the information to be retrieved is spread across a number of data loops. Therefore, it may be necessary to retrieve a number of data loop identifiers and/or a number of data element identifiers. In some embodiments, tables mapping one or more identifiers (e.g., data loop identifiers, data element identifiers, information identifiers, etc.) may be stored in a centralized server. Additionally or alternatively, the tables mapping the one or more identifiers may be stored in one or more data loops (e.g., such that they are accessible to any device wishing to perform a lookup, etc.).

At step 520, suspended data storage system 100 may receive accessing instructions for the one or more data loops. In various embodiments, step 520 includes accessing a header of one or more data loops containing the desired information to retrieve the accessing instructions. For example, a device may access data element one 310 of a data loop containing the desired information to determine a data element index containing the desired information. In some embodiments, step 520 includes determining a data element index identifier. Additionally or alternatively, step 520 may include retrieving triggering information indicating at what time interval (e.g., a delay measured from a beginning of the data loop, etc.) of a data loop a particular piece of data is located.

At step 530, suspended data storage system 100 may determine a location of the desired data element within the one or more data loops based on the accessing instructions. In various embodiments, step 530 includes identifying a data element index of a data element containing the desired information. Additionally or alternatively, step 530 may include identifying one or more nodes (e.g., computing devices, etc.) connected to the path the data loop exists on. For example, a first device may retrieve accessing instructions from a first data loop identifying a second data loop containing the desired information and the first device may identify a second device having access to the second data loop that the desired information is stored on based on the accessing instructions. At step 540, suspended data storage system 100 may retrieve the desired data from the determined locations of the one or more data loops. In various embodiments, step 540 includes receiving a data loop at a node of a path of the data loop and retrieving information included in one or more data elements of the data loop. In various embodiments, suspended data storage system 100 (e.g., a device thereof, etc.) may retrieve one or more data elements determined during step 530 (e.g., the data elements corresponding to the determined data element indices, etc.). In some embodiments, step 540 includes accessing a number of data loops. For example, a computing device may simultaneously access three data loops storing the same information in parallel, thereby facilitating faster data access speeds (e.g., data read speeds, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of suspended data storage system 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for storing information on a computer network, comprising:
   receiving, at a second computing device from a first computing device, data to be stored as propagating signals over one or more network connections of the network for a duration of storage;
   generating, by the second computing device, a data packet including the data and accessing instructions having a parameter necessary for retrieving the data from the one or more network connections of the network;
   transmitting, by the second computing device to a node of the network, the data packet, the network comprising one or more nodes and the one or more network connections, wherein each node of the network is configured, for the duration of storage, to receive the data packet, and upon receiving the data packet, execute instructions to transmit the data packet to another node of the network over an associated network connection, whereby the data packet is stored as a propagating signal over the one or more network connections of the network for the duration of storage; and retrieving, by the second computing device, the data packet from network connections of the network according to the accessing instructions, wherein retrieving the data packet includes accessing the data packet at an index location of an existing data loop.

2. The method of claim 1, wherein the one or more nodes include a computing device.

3. The method of claim 1, wherein at least one of the one or more network connections constitute a communication path that originates and terminates at the second computing device, thereby forming the existing data loop.

4. The method of claim 3, further comprising identifying an additional existing data loop between a first node and a second node of the network storing a different data packet in associated network connections and inserting the data packet into the different data packet of the additional existing data loop, whereby the data packet and the different data packet are stored in the associated network connections of the additional existing data loop.

5. The method of claim 3, wherein storing the data packet as propagating signals in network connections of the network includes storing the data packet in network connections of two or more data loops in parallel.

6. The method of claim 1, wherein at least one of the second computing device or the one or more nodes includes a server.

7. The method of claim 1, further comprising:
receiving, by the second computing device, a request for access to the data; and
retrieving, by the second computing device, the accessing instructions including the parameter.

8. The method of claim 7, wherein the parameter is indicative of the index location associated with a particular network connection of the network, wherein the data packet is stored as a propagating signal over the particular network connection.

9. The method of Claim 7, wherein retrieving the data packet from network connections of the network includes retrieving a first portion of the data packet from a first location associated with a first network connection of the network and retrieving a second portion of the data packet from a second location associated with a second network connection of the network.

10. The method of claim 9, wherein the second computing device retrieves the first portion and the second portion in parallel.

11. The method of claim 1, wherein the one or more network connections include a fiber-optic cable, and the propagating signals include optical signals.

12. The method of claim 11, wherein the propagating signals include infrared light.

13. The method of claim 1, wherein the data packet includes a stop bit.

14. The method of claim 1, wherein the propagating signals include a time-varying voltage signal.

* * * * *